(12) United States Patent
Gusikhin et al.

(10) Patent No.: US 10,740,063 B2
(45) Date of Patent: Aug. 11, 2020

(54) METHOD AND APPARATUS FOR ENHANCED CONTENT REPLACEMENT AND STRATEGIC PLAYBACK

(71) Applicant: FORD GLOBAL TECHNOLOGIES, LLC, Dearborn, MI (US)

(72) Inventors: Oleg Yurievitch Gusikhin, Commerce Township, MI (US); Ayush Chandrakanth Shah, Belleville, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/207,505

(22) Filed: Dec. 3, 2018

(65) Prior Publication Data

US 2020/0174737 A1    Jun. 4, 2020

(51) Int. Cl.
| | |
|---|---|
| *G06F 17/00* | (2019.01) |
| *G06F 3/16* | (2006.01) |
| *G06N 5/02* | (2006.01) |
| *H04H 20/62* | (2008.01) |

(52) U.S. Cl.
CPC ............. *G06F 3/165* (2013.01); *G06N 5/02* (2013.01); *H04H 20/62* (2013.01)

(58) Field of Classification Search
CPC .................................. G06F 3/165; G06F 3/167
See application file for complete search history.

(56) References Cited

U.S. PATENT DOCUMENTS

| | | | |
|---|---|---|---|
| 2003/0114968 A1* | 6/2003 | Sato ................. | G01C 21/26 701/36 |
| 2006/0272480 A1* | 12/2006 | Gimarc ............. | G06Q 30/0264 84/600 |
| 2010/0023964 A1* | 1/2010 | Basso ............... | H04N 21/812 725/32 |
| 2011/0054646 A1* | 3/2011 | Hernandez ........ | G06F 16/632 700/94 |
| 2011/0088054 A1* | 4/2011 | Malik ............... | G10L 13/043 725/29 |
| 2015/0379118 A1* | 12/2015 | Wickenkamp ..... | G06F 16/61 707/758 |
| 2017/0289346 A1* | 10/2017 | Suzuki .............. | B60N 2/002 |
| 2017/0324491 A1 | 11/2017 | Littlejohn | |
| 2018/0035174 A1 | 2/2018 | Littlejohn | |

FOREIGN PATENT DOCUMENTS

KR    20170007045 A  *  1/2017

* cited by examiner

*Primary Examiner* — Joseph Saunders, Jr.
(74) *Attorney, Agent, or Firm* — Michael Spenner; Brooks Kushman P.C.

(57) ABSTRACT

A system includes a processor configured to predict an upcoming stop. The processor is further configured to select content for playback during the stop, responsive to predicting the upcoming stop. The processor is additionally configured to detect a vehicle stop corresponding to the predicted upcoming stop and responsive to the detected stop, play the selected content.

15 Claims, 6 Drawing Sheets

METHOD AND APPARATUS FOR ENHANCED CONTENT REPLACEMENT AND STRATEGIC PLAYBACK

TECHNICAL FIELD

The illustrative embodiments generally relate to methods and apparatuses for enhanced content replacement and strategic playback.

BACKGROUND

Modern vehicles have access to a variety of content from a variety of sources. Vehicle infotainment systems can access radio signals, onboard wireless and directly plugged-in signals providing content from connected devices, as well as streaming content from remote sources. Most content is tailored to a user in some manner, from radio stations providing certain categories of content down to user-organized content from streaming or saved sources.

Content providers who rely on certain types of vendor content to pay for the costs of content will typically include the certain types of content at a certain volume or rate within a block of content. Selection of vendor content is typically performed by the overall content provider, and timing of vendor content playback typically occurs interspersed with entertainment content at fixed times and/or in fixed allotments.

SUMMARY

In a first illustrative embodiment, a system includes a processor configured to predict an upcoming stop. The processor is further configured to select content for playback during the stop, responsive to predicting the upcoming stop. The processor is additionally configured to detect a vehicle stop corresponding to the predicted upcoming stop and responsive to the detected stop, play the selected content.

In a second illustrative embodiment, a method includes selecting content for playback during the stop from a pool of content blocks having varied timing, responsive to determining an upcoming vehicle stop and predicted stop duration, the content selected such that selected blocks aggregate to at least the predicted stop duration. The method further includes detecting the predicted stop and, responsive to the stop, playing the selected content blocks.

In a third illustrative embodiment, a method includes predicting an upcoming stop and stop duration. The method further includes selecting a plurality of content blocks for playback during the predicted stop, including altering the duration of at least one content block, such that an altered aggregated timing of the plurality of blocks more closely matches the stop duration than an original aggregated timing. Further, the method includes ordering the selected blocks for playback such that unaltered blocks are played before altered blocks and playing back the selected content blocks as ordered, responsive to detecting the predicted stop.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
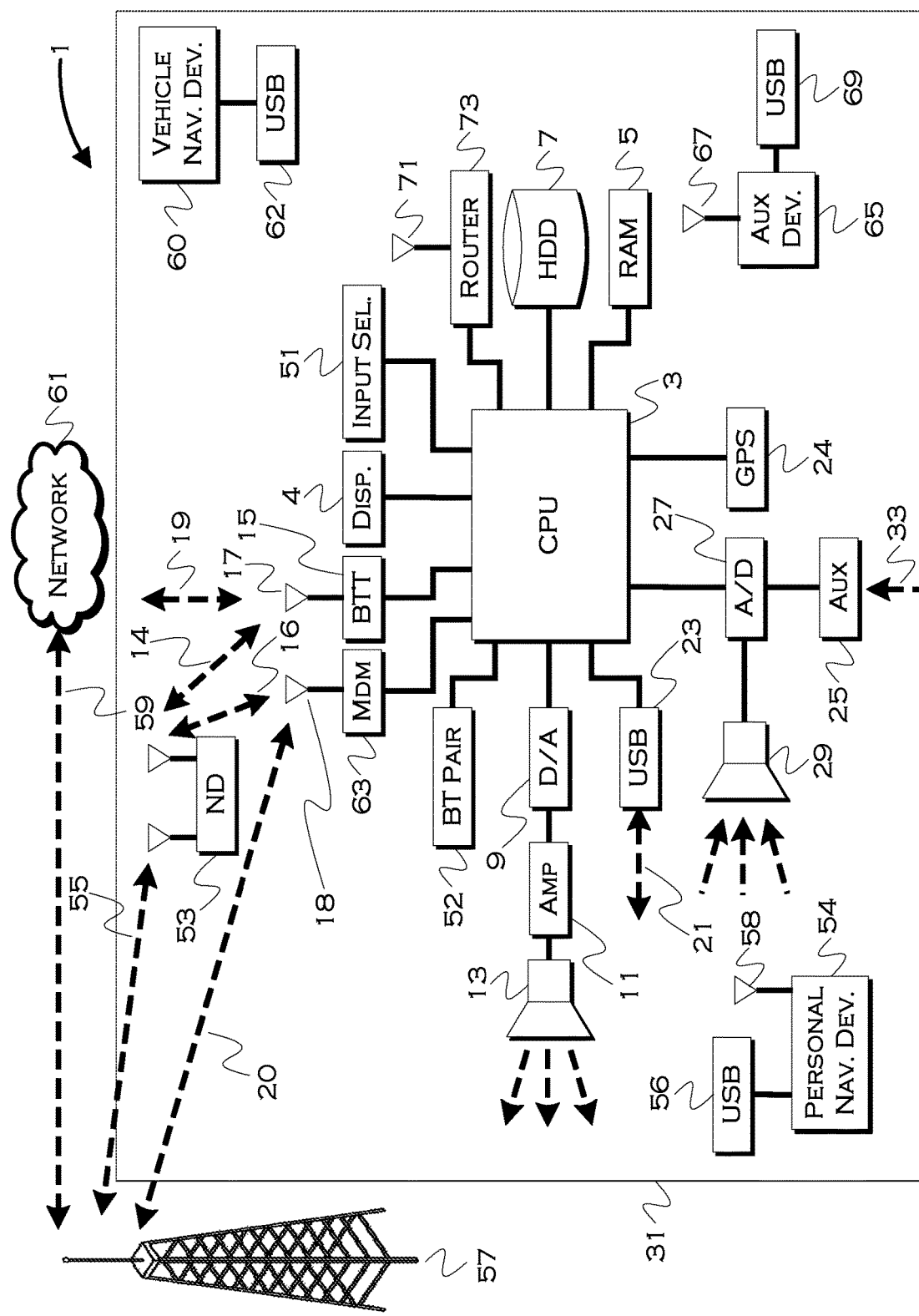
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While content providers typically provide a blend of entertainment and vendor content, other than calibrating the vendor content to expected overall audience demographics, there is typically very little selectivity with regards to in-vehicle vendor content selection.

Also, driving a vehicle is a complex task, and there are a variety of distraction sources along every drive. As such, at any given moment, it may be difficult for a driver to focus on what is playing on a radio. Thus, it could be potentially useful if a content provider could deliver content that may require more driver attention, such as vendor content, at times when the driver is expected to have more mental resources available to listen to and comprehend the vendor content.

When content is a blend of entertainment and vendor content, in a pre-recorded or pre-planned set of blocks, such as is traditionally the case, timing playback of certain types of content is a mere accident of fate. That is, a radio station may play four songs, or a talk-clip, and then five minutes of vendor content. Unless a vehicle happens to be stopped at some point during that five-minute block, the radio content provider has no control over when, in terms of whether a vehicle is moving or stopped, the driver hears one type of content versus another.

Even streaming content services lack this ability to time content playback. While these services may possess some demographic information about their individual users, and while they may be able to tailor content based on, for example, a user profile or entertainment selection, vendor content is still typically interspersed with entertainment content in a manner designed to achieve goals related relative timing or volume, i.e., X minutes of vendor content for every Y minutes of entertainment content or N songs.

By allowing for content delivery timing, and/or profile-driven content selection, the illustrative embodiments improve the vendor content paradigm by providing at least some vendor content at points where a driver is expected to have more mental capacity to consume and comprehend the content, and even, if necessary, respond to the content.

In one illustrative example, for instance, a content provider may want to play one portion of content type A for every four portions of content type B. Content type A can function as a cost-offset to provide value in exchange for the playing of content type B, which may be the content designed to keep listeners tuned in.

A driver on a fifteen-minute drive may thus experience 3 minutes of content A and 12 minutes of content B. Along the drive, the driver may stop a total of six times, for three fifteen second intervals, two 45 second intervals and a one-minute interval. Thus, in this fifteen-minute drive, there is a total stop time of three minutes and fifteen seconds.

In a typical radio model, with uniform content broadcast over a listening area, there is a reasonable chance that one or more stops will occur during broadcast of content A, but virtually no chance that content A will be playing over the duration of all, or even most, stops. This is because the radio tends to broadcast content A in 1.5 to 3 minute blocks, for example, and thus the driver must coincidentally be stopped when content A is playing, in order to hear content A while stopped.

In a streaming model, content A and content B may be selected based on user preferences, to some extent, but is still commonly played in blocks. So, for example, for every three instances of content B, a user may be required to listen to one instance of content A. While this may break up the "block model" to some extent, there are still virtually no assurances that the user will be stopped for anything less than an expected 20% of the time during content A playback, which is simply the approximate percentage of total stop time of the whole journey.

Under the illustrative embodiments, a content source can actively both select certain tailored content and/or time the playback of that content to coincide with instances where a content type A provider would prefer a user be listening. That is, content producers of type B content are generally agnostic about when someone is listening, whereas content producers of type A content generally prefer to have a user's attention. By timing the playback of content to times when a user is expected to have more attention to dedicate to active listening, the likelihood of absorption and eventual response to content A is increased.

So, then, under the illustrated example, if a content provider wants to play 3 minutes of content A for every 12 minutes of content B, by timing the playback of content A, significantly higher coincidence of content A playback with stop-time can be achieved through the illustrative embodiments. Because of start and stop timing of both types of content, it may not always be possible to fully capture the 3+ minutes of stop time in the example with content A playback, but it is not unreasonable to achieve saturation that is 50%+ or even much higher (e.g., 30-50% of stop time, even though stop time is only 20% of the journey). Depending on the predictive nature of the stops (e.g. signs vs. lights) and an interruptible nature of content B (e.g., talk radio vs. a song), it may be possible to achieve even much higher saturation of the stop time with content A playback.

Figure 2:
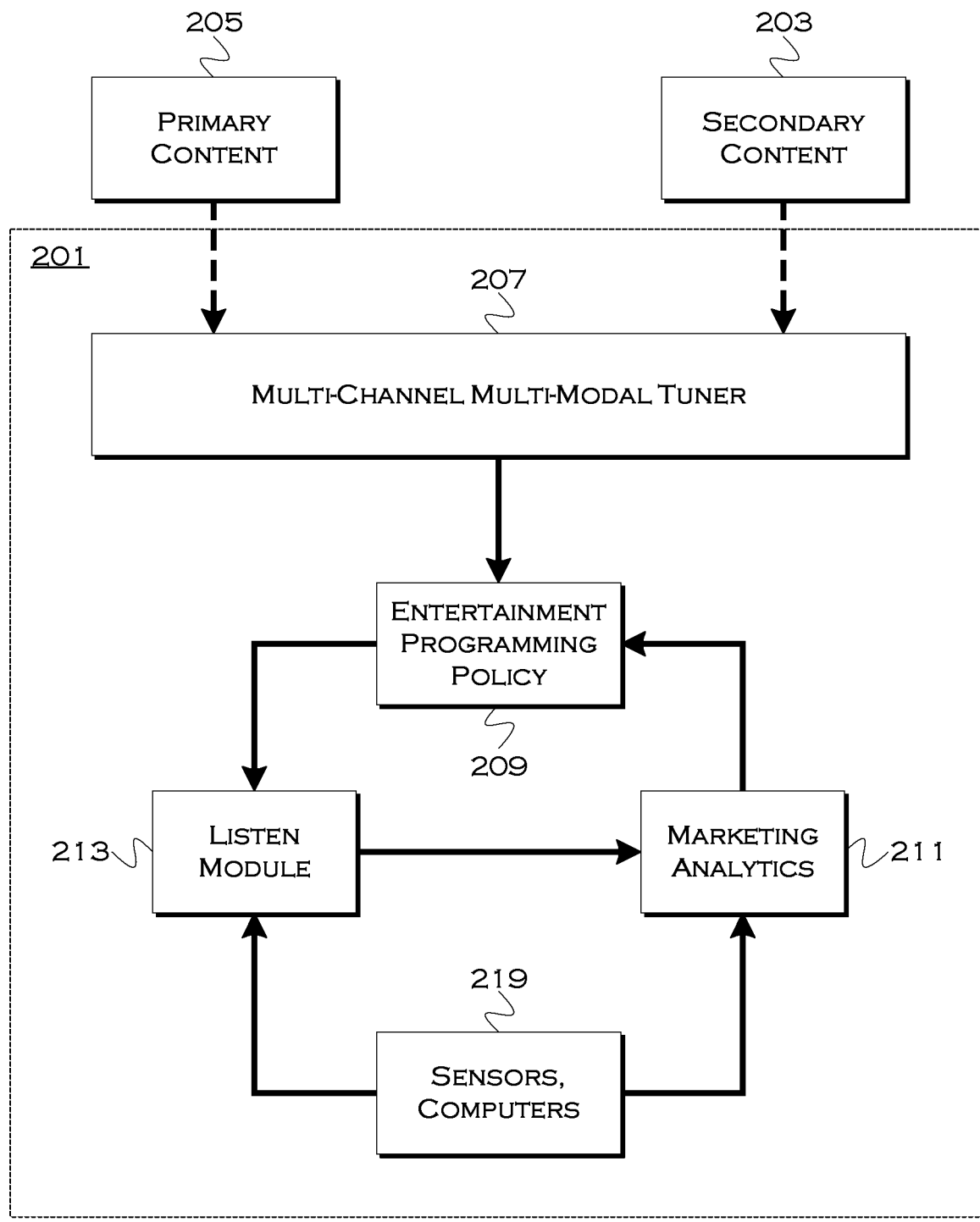
FIG. 2 shows an illustrative example of a content selection and playback system.

FIG. 2 shows an illustrative example of a content selection and playback system. In this example, vendor content comes from announcement sources 203, and entertainment content 205 comes from alternative sources. Both streams come into the vehicle 201 and flow into a multi-modal tuner, for example. The multi-modal tuner provides content streams to a vehicle entertainment system 209, which can be controlled by one or more general playback policies, as well as onboard or offboard digital marketing analytics 211. The policies may define, for example, volumes of content from varied sources, types of content from varied sources, selection of content from varied sources, etc. to be played for a listener 217.

In this example, to assist in determining when content of varied types should be played, the vehicle sensors 219 and computers (e.g., a navigation module) can provide information to both the listen data 213 module and the digital marketing analysis module. Working in conjunction, these systems can selectively provide tailored content at discrete, planned intervals, corresponding to either experienced or predicted stop times.

Content playback can also be conditionally planned, for example, such that a system may include an instruction to play back type-A content during at least one minute of stops for every ten minutes of travel. Obviously, if a one-hour drive on a highway is planned, then the user will never stop, and the model may need to be adjusted. At the same time, while traveling through a neighborhood with a stop sign at every corner, a user may be annoyed if type-B content is interrupted every 45 seconds to hear type-A content as the user reaches each stop sign. Accordingly, the system can adaptively accommodate known or experienced stops, and, in the first highway instance, switch to a more traditional block-playback or 1-for-3 (or similar) tradeoff of content A for content B. In the second instance, the system may predict the longest likely stops, or select one out of every four stops, for example, to playback content B, so as not to overly irritate a driver.

Both of these adaptations can accommodate the drive scenarios proposed, and at least in the second instance, the system will still benefit from delivery of content A at known stop times, with a higher frequency than if the content was simply randomly distributed.

Figure 3:
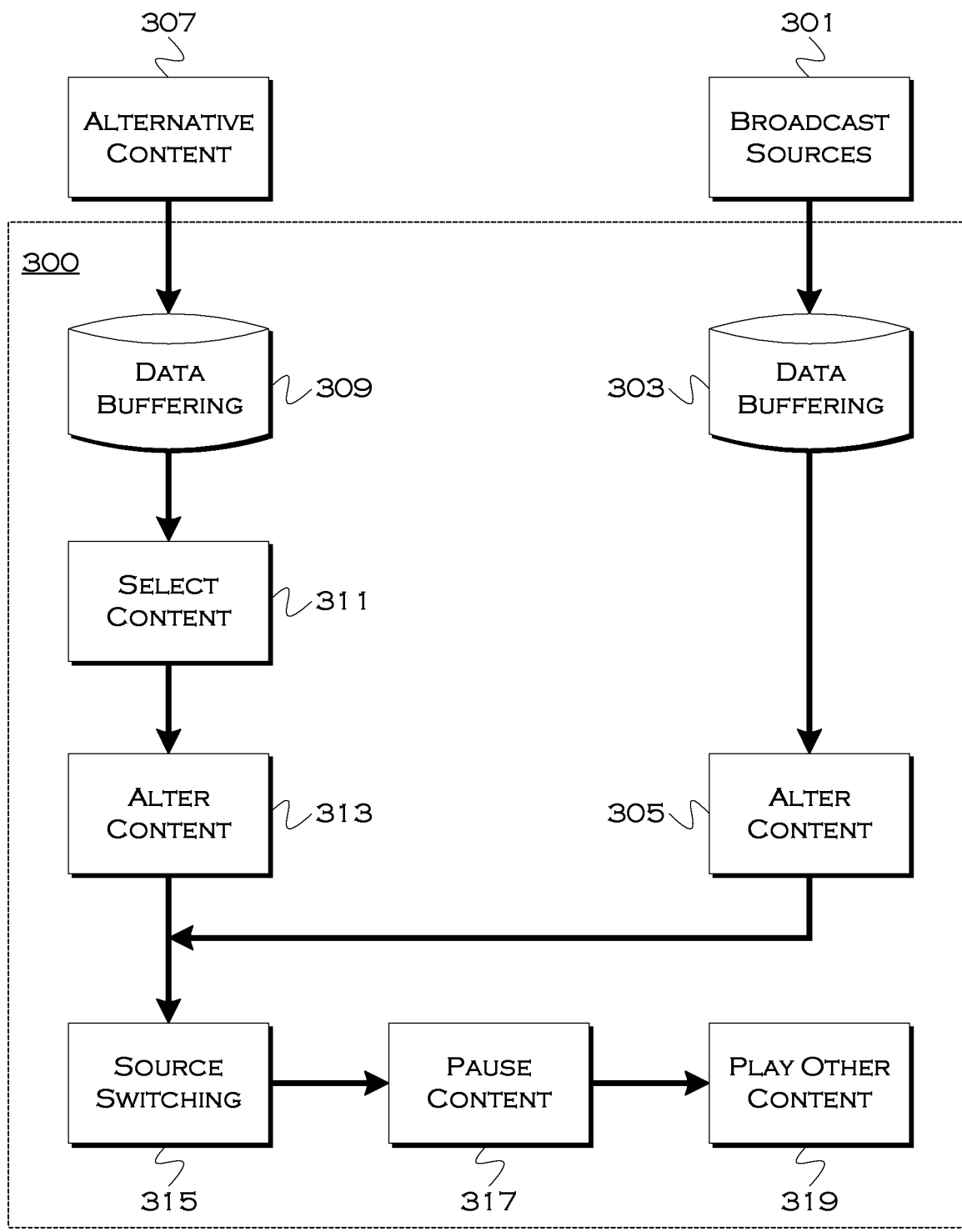
FIG. 3 shows an illustrative example of varied content sources provided to a vehicle.

FIG. 3 shows an illustrative example of varied content sources provided to a vehicle. Type B content 301, for example, can come from a variety of sources, including terrestrial, satellite, internet, personal collections, etc. This content may be received in the vehicle and buffered into a queue 303 where it is sorted by first in first out (FIFO) or other user preferences.

At the same time, type A content 307 may also come from a variety of similar sources, although this may not necessarily coincide with a source for type B content. If a vehicle acts as the decision-maker for both content type's playback, the vehicle may select appropriate content A and timing (stored onboard 309 in one or more queues), as well as content B timing, and then provide some value to the selected content B's provider, in exchange for higher value content A playback delivered with better timing. Then, in this model, the vehicle manufacturer and content B provider may both benefit from a higher value content A delivery. And, in many instances, a user may prefer content B while driving anyhow, so greater value can be achieved all around, in those instances.

In this example, a time stretcher 305, 313 is capable of mildly expanding or contracting the rate of content playback, to effectively better time the start and end of certain content types. For example, if a content B block was 2:45 long, and a content A block was 0:27 long, and a user was projected to stop two minutes and fifty one seconds after content B began, and to stop for thirty seconds, the system may expand playback of the content B block for an extra six seconds, to time the start of the content A block to better coincide with the projected stop. If the vehicle stopped early, the model may reverse, compressing both the remainder of content B and content A, in an attempt to have as much of content A played during the stop as possible. This switch 315 between content sources can be done onboard the vehicle, via the vehicle entertainment system 300, which can pause 317 source playback and switch 319 output streams.

Content compression and expansion can be achieved in a manner that does not change the pitch or other audio characteristics in a noticeable manner (noticeable by a typical listener), and may also be an aspect that is user agreed-upon, in exchange for, for example, less overall type A content and/or assurances that type B content will be played during drive-time (if that is preferred, for example). Certain types of content may be more suitable for compression or expansion, and the content itself may also include indicators (e.g., in a header) of maximum compression/expansion, permissibility of compression/expansion, etc. Since the system can receive the content in advance of playback, decisions and actualizations of compression/expansion can often be performed in advance, although on-the-fly compression/expansion is also possible.

Figure 4:
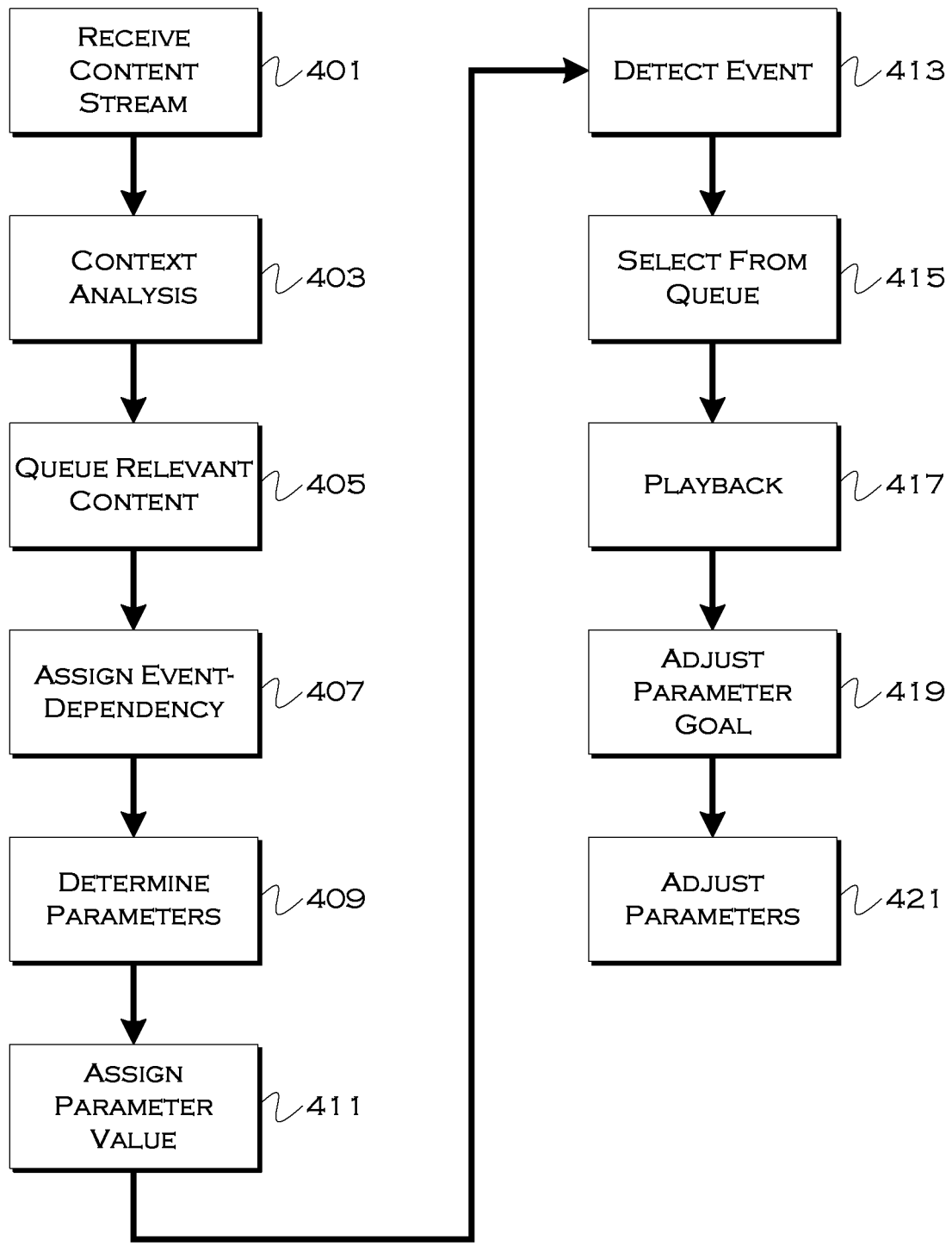
FIG. 4 shows an illustrative example of content playback.

FIG. 4 shows an illustrative example of content playback. In this example, the process may receive 401 one or more content streams from one or more content sources. This can include, for example, a content B source dictated by a content provider (e.g., a radio station) and a content A source dictated by a vehicle provider. As the varied content streams arrive, the receiving process can perform 403 a context analysis, which may useful in selecting content A and even content B, if multiple sources for content B content exist. The process can queue 405 relevant content from each source, which in the case of content B coming from a radio station may be all content or the entertainment portion of the content. In the case of content A, the process may also queue all content or some content meeting contextual or timing parameters.

Also, in this example, the process can assign 407 event dependency to certain content blocks. For example, 15 second blocks of content A can be assigned a "stop sign" or "speed below X" dependency, indicating that those content blocks should be prioritized or selected when a vehicle encounters (or is projected to encounter) a stop sign and/or when vehicle speed drops below, for example, 10 miles per hour. These can also be contingent dependencies, for example, such that if a certain volume or total time of content A blocks is above a threshold, the process ignores dependencies for a period of time or a distance of travel.

The process may also determine certain parameters 409, which may reflect the goals of the content B provider(s), in terms of value or total time of content A playback to content B playback. Since the system may be selecting content A to be both targeted and well-timed, the actual value of content A may increase, and thus for content B having no fixed schedule, a revenue goal may be achievable with less content A playback, increasing content B playback time.

On the other hand, if content B is talk radio, having defined timing and defined content A time blocks, the system may parameterize based on total content A time, as opposed to content A value. That is, the system may play back content B for a fixed total time and content A for a fixed total time, but may reshuffle the playback of when those times occur to better coincide with stops or other predicted areas of high attention. In this model, unless the content B provider has excess content provided in advance, the system may have to follow a content B provider schedule for content A playback (even if content A is selected by the vehicle) until a suitable buffer of content B accumulates (by accelerated content A provision) such that content B can be played during a time when the content B provider is providing type A content.

For example, if the radio played 10 minutes of content B followed by 5 minutes of content A, but content B was talk radio and so the vehicle could not reasonably insert filler-content of type B from another source, the vehicle may begin a journey by playing vehicle-selected content A at whatever time the content B provider would normally be playing content A content. At some point, while type B content is playing, the vehicle may stop, and the vehicle could then insert additional type A content during the stop, while buffering the still playing type B content. Then, during the next planned (e.g., planned by the content B provider) type A content block, the vehicle could continue playing content B from the buffer, if the vehicle was still traveling, until either the content A block ended or the vehicle stopped (causing the vehicle to transition to type A content as well).

In other instances, such as random or playlist style type B content, it may be simpler to insert type A content at stops, although the system may still want to wait for a logical break, such as the end of a song. By leveraging some predictive capability (e.g., known road features, signs, controls, as well as routing and heading), the system can also determine in advance of a stop whether type B content should continue (e.g., play another song) or whether type A content should begin, even if a bit in advance of the actual stop.

In this example, the process can assign 411 a parameter value (e.g., time, value, etc.) to at least some of the content A type content in the queue. When an event is detected 413 (or predicted), the process can select 415 type A content for playback. This can include selection based on strict timing or selection based on strict value or selection based on a combination of possible parameters.

For example, if a vehicle has a goal of playing back two minutes of type A content, and a stop of 45 seconds is projected, the vehicle may select three 15 second type A blocks, a 15 second and a 30 second block, etc. On the other hand, if the goal is two minutes or X value, the vehicle may select high value content first, even if it will not fill the whole block e.g., two 20 second blocks of high value. Five seconds of predicted stop time remains, but since the value component may have been achieved, the user can then benefit from five extra seconds of content B content. This is also an instance where the system could further stretch either content type to fill the extra five seconds if needed, since in some instances the extra type B content would just be dead air (e.g., when no surplus type B content was planned or buffered).

Once the process has played 417 the selected type A content, the process can register 419 what parameter goals were met by the playback (e.g., did both 20 second blocks play, or did the vehicle move early or stop late, resulting in only one block being played). This goal can then be used to adjust parameter expectations for the remainder of a journey or the remainder of a time segment. In some instances, it may be useful to consider content in terms of time segments, since a total journey time may be unknown, and stopping and delay prediction may be easier for more immediately encountered roads, than for roads encountered miles or hours into the future. Overflow and underflow of certain content types can bleed over into a next-segment, in this model, so that, for example, content A playback may be largely constrained to surface road (as opposed to highway) travel, even if 70% of a journey takes place on a highway. If the over/underflow value grows too high (e.g., if the system is expected to play 10 minutes of content A, but only 20 minutes remain in a journey), then the system may begin to play content A at sub-optimal times, in order to achieve the overall target for content A playback.

Figure 5:
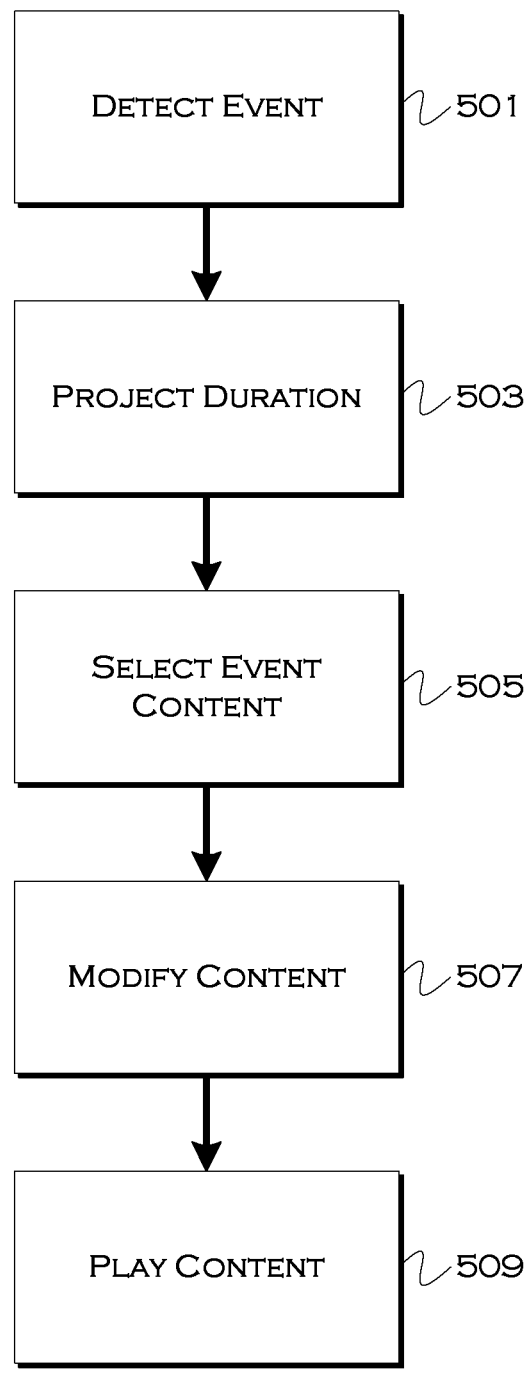
FIG. 5 shows an illustrative example of selecting or planning content for a given event.

FIG. 5 shows an illustrative example of selecting or planning content for a given event. In this example, an event is a situation whereby a predefined decision has been made about the suitability of, for example, content A playback. This can include both proximity to a content A vendor and/or a more generalized expectation of driver attentiveness, represented in the presented examples by stops, but which also could include slow travel, low traffic, rural travel on an intersectionless road, etc. Content can also be earmarked to certain event suitability (e.g., an interactive type A content block may require an actual stop) and/or may derive an increased parameter value (in terms of meeting content A playback goals) based on event-type. That is, content A played in proximity to a content a vendor or played at a stop as opposed to during slow travel may derive an increased value in terms of meeting goals (as well as a possible increased real-value).

In this example, the process detects 501 an event, which can include, for example, actually detecting the event (e.g., the vehicle stops or slows below 5 mph) or predictively detecting the event (e.g., a stop-sign is upcoming on a route, or a traffic control is predicted to be red). The process also predicts 503 the duration of the event, which could include, for example, predicting 15 seconds for a stop or 30 seconds for a light. Vehicle sensors, as well as road data, can be used to increase the accuracy of prediction by, for example, detecting signs and light states, as well as existing interposing and current traffic. For example, a vehicle camera may detect an upcoming stop sign, as well as a vehicle rear that is much closer than the sign. Based on relative sizing, for example, the system could predict that three vehicles exist between a present vehicle and the sign, and therefore a stop of 60 seconds, as opposed to 15 seconds, may be expected.

The process can then select 505 content projected to fill some or all of the projected stop, which can include both selection of overflow content (if the stop takes longer than expected) and/or modification 507 of content to fully fill the stop. For example, if two 20 second and one 15 second type A blocks were selected, each could be extended 10 percent, but an overflow block could also be selected. The system could play 509 the shortest block first, and if the vehicle had not moved at all (but was expected to have moved one car length, in the stop sign example above), the system could branch to an unmodified version of the two 20 second blocks, expecting to now additionally play a 15 second overflow block because the stop was taking longer than expected.

The first block would have been played in an extended format (because the vehicle needed to determine the extra-delayed nature of the stop), but if vehicles were clearing the intersection more slowly than expected, this would allow the process to adapt to this fact and fit in an entire additional type A block. If traffic began moving more quickly, the process could switch back to the extended content versions of the 20 second blocks, extend them slightly further (if possible) or accelerate the content of all remaining blocks in an attempt to maximize type A volume in the time remaining.

Figure 6:
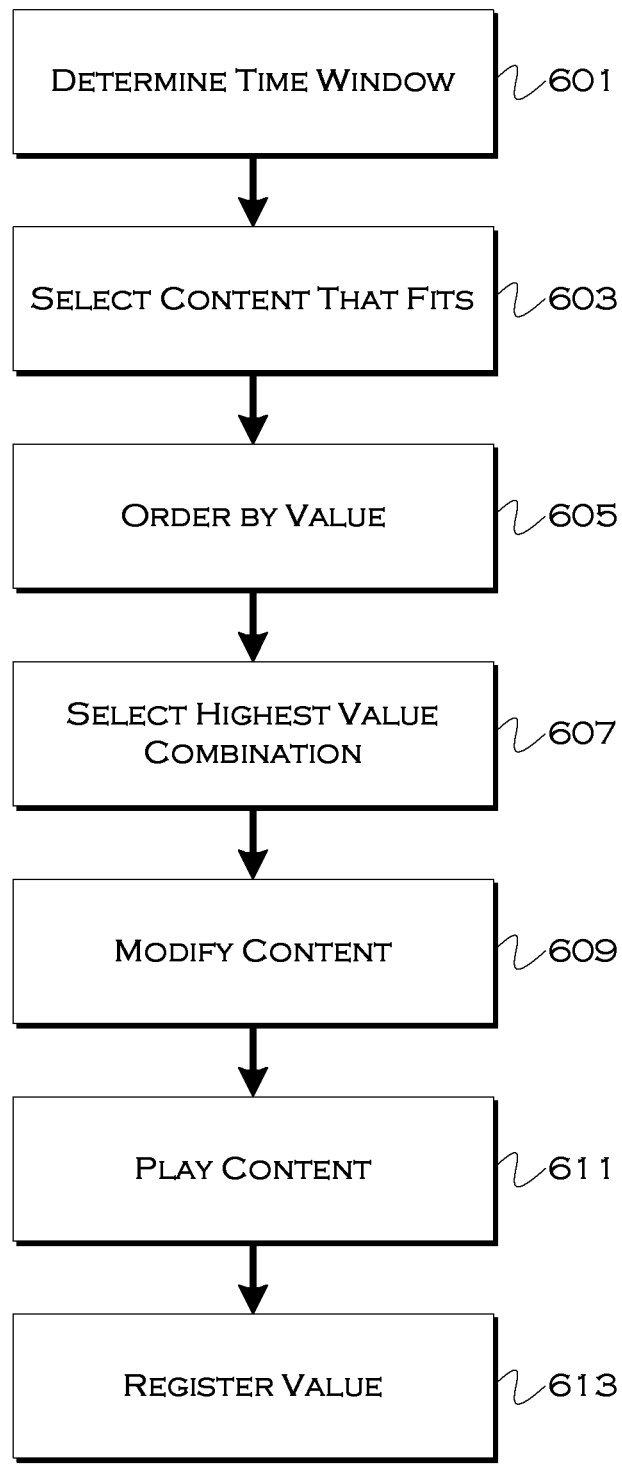
FIG. 6 shows an example of selecting content from multiple sources to fill a time block.

FIG. 6 shows an example of selecting content from multiple sources to fill a time block. In this example, the time block would be a block for type A content playback, but other suitable examples could exist. This process could also select content for a single type A playback event (e.g., one stop) or a total amount of expected or required type A playback for a journey or journey-segment.

In this example, the process determines 601 the duration of a time window, based on, for example, an upcoming projected event time-window, a currently occurring event time window, a total required overall time window, etc. In the former two cases, the process may be selecting immediate playback content, whereas in the latter example, the process may be creating a sub-queue of type A content for application when particular event windows occur.

In this example, the process selects 603 a variety of content that will fit within the window, which can include, for example, extended or compressed content, as well as more total content than required to fill the window, provided that, for example, no individual type A content block would individually exceed the window at maximum permissible compression. So, for example, if a time window was one minute long, the process may select four 15 second blocks, two 20 second blocks, a 30 second block and a 45 second block. This is plainly far more time than is needed to fill the window, but these could represent contextually appropriate blocks from a larger reserve of type A blocks, or the most recently received type A blocks that fit the timing model.

The process may then, for example, order 605 the blocks based on value. The value of a block may vary based on the event for which the time window is applicable, or all blocks may have a value assigned by a block creator/provider. Ordering is not a necessary step, but if no other block selection is made, then ordering may be the simple process by which blocks are selected. The value can be an aggregate value or a value per second. For example, a 15 second block may have a value of 0.15, representing 0.01 per second, and a 30 second block may have a value of 0.25, which is a higher total value but less value per second. If the only other 15 second block had a value of 0.05, then the best value for 30 seconds of type A content would be from the 30 second block, even though the first 15 second block has the highest value per second.

Because of situations such as the above, in at least some instances it is worthwhile to apply selection 607 processes to the type A blocks, in order to maximize value for the time allotted or planned. This may also require modification 609 of content, such as compressing or stretching content. In some instances, the modification may also effect a slight change to value, in that a provider may be willing to pay slightly more or less depending on effective real duration during playback. In other instances, the stretching or compressing may be done to meet content delivery timing goals, which can include both total content time and/or reasonableness of overall flow (e.g., to avoid dead-air).

The process plays 611 the content once an event correlated to the timing window occurs, and then registers 613 the actual parameter goals achieved. Because the window often includes a predictive component, it may be useful to wait until the window ends before determining how much of a total type A goal was achieved during the window, for example. Also, in some models, more credit (towards a goal) may be given for type A playback during stops, for example, and so even if a full type A block is played, with a portion after travel resumes, the credit may be increased in terms of meeting a goal for the portions play partially or fully during the stop.

In addition to changing the length of a broadcast, the illustrative embodiments can also change the language of a broadcast, depending on context. This can include, for example, playing an advertisement in a different language, or inserting slang terms, or other terms designed to tailor a particular advertisement to user context. For example, terms and phrases in an advertisement can be earmarked for replacement, and the onboard process can change those terms into terms found to be more appealing for a particular audience.

By planning content, contextually selecting content, and delivering selected content at times when a driver is expected to be more likely to be paying attention, as well as by accommodating the content within the context of discrete present and predicted events, the illustrative embodiments allow for increased value and expected comprehension/response to certain types of content, over traditional mass-delivery models, and even over current tailored models.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
predict an upcoming stop, including predicting a duration of the upcoming stop, prior to reaching a point where the stop occurs;
select content for playback during the stop, responsive to predicting the upcoming stop, the content selected based on a duration at least as long as the predicted stop duration;
detect a vehicle stop corresponding to the predicted upcoming stop;
responsive to the detected stop, play the selected content;
determine, after the stop has occurred, that a length of stop will be different than predicted, based on actual vehicle movement following the stop being different than vehicle movement predicted as the basis for predicting the duration of the stop;
and, responsive to determining that the length of stop will be different, altering a content-playback plan to either extend the duration of selected content or reduce the duration of selected content, based on whether the stop is determined to be longer or shorter than originally predicted, respectively.

2. The system of claim 1, wherein the processor is configured to extend the duration of selected content, by changing audio characteristics of the content, to extend the duration to match or exceed the determined duration determined after the stop has occurred.

3. The system of claim 2, wherein the processor is configured to revert any content that was artificially extended to accommodate the originally predicted stop to an original format, responsive to determining that the detected stop will end sooner than originally predicted, after the stop occurs.

4. The system of claim 1, wherein the processor is configured to alter the duration of selected content, by changing audio characteristics of the content, to shorten the duration to match the originally predicted duration.

5. The system of claim 4, wherein the processor is configured to revert shortened content to an original format, responsive to determining that the detected stop will last longer than originally predicted, after the stop occurs.

6. The system of claim 4, wherein the processor is configured to select additional content to be added to the selected content, responsive to determining that the will last longer than originally predicted, after the stop occurs.

7. The system of claim 1, wherein the processor is further configured to predict the upcoming stop based on an upcoming traffic control feature indicated by map data.

8. The system of claim 1, wherein the processor is further configured to predict the upcoming stop based on an upcoming traffic control detected by a vehicle sensor.

9. The system of claim 1, wherein the processor is further configured to condition playback of the selected content based on requirements specified by a content provider of content playing prior to the detected stop.

10. A method comprising:
responsive to determining an upcoming vehicle stop and predicted stop duration, prior to reaching a point where the stop occurs, selecting content for playback during the stop from a pool of content blocks having varied duration, the content selected such that selected blocks aggregate to at least the predicted stop duration;

detecting the predicted stop;
responsive to the stop, playing the selected content blocks;
extending or shortening the duration of at least one selected content block, by varying audio characteristics of the at least one content block, to extend or shorten the duration of the selected content blocks to at least the predicted stop duration; and
choosing between altered and original versions of the at least one content blocks, as playback of the selected content blocks occurs, based on variances between observed stop characteristics and predicted stop characteristics, related to observed vehicle movement as opposed to predicted vehicle movement, to dynamically match total playback time for the selected content blocks to a modified predicted stop duration based on the variances observed after the stop has occurred.

11. The method of claim 10, wherein the stop duration is predicted based on a type of traffic control feature that is the basis for predicting the stop.

12. The method of claim 10, wherein the content blocks have varied values associated therewith and wherein the selecting is further based on the selected content blocks having the highest aggregate value from all groupings of content blocks meeting a timing threshold based on the predicted stop duration.

13. A method comprising:
predicting an upcoming stop and stop duration of the upcoming stop;
selecting a plurality of content blocks for playback during the upcoming stop, including altering the duration of at least one content block, such that an altered aggregated timing of the plurality of blocks more closely matches the stop duration than an original aggregated timing;
ordering the selected blocks for playback such that unaltered blocks are played before altered blocks; and
playing back the selected content blocks as ordered, responsive to detecting the upcoming stop.

14. The method of claim 13, further comprising selectively choosing between altered and original versions of the at least one content blocks, as playback of the selected content blocks occurs, based on variances between observed stop characteristics and predicted stop characteristics, attempting to match total playback time for the selected content blocks to a varied predicted stop duration based on the variances.

15. The method of claim 13, wherein the upcoming stop is predicted based on a traffic control as indicated by a digital map and wherein the duration is predicted based on a type of the traffic control.

* * * * *